United States Patent [19]

Avis

[11] 4,244,277
[45] Jan. 13, 1981

[54] REDUNDANT SERVO WITH FAIL-SAFE ELECTRIC SYSTEM

[75] Inventor: William D. Avis, Costa Mesa, Calif.

[73] Assignee: Parker-Hannifin Corporation, Cleveland, Ohio

[21] Appl. No.: 16,993

[22] Filed: Mar. 2, 1979

[51] Int. Cl.³ ............................................. F15B 13/04
[52] U.S. Cl. ..................................... 91/459; 91/363 A
[58] Field of Search ................. 91/459, 1, 361, 363 A, 91/509; 244/194, 195; 60/403, 404, 405; 137/625.62, 625.64

[56] References Cited

U.S. PATENT DOCUMENTS

| | | | |
|---|---|---|---|
| 3,263,572 | 8/1966 | Sunderland | 91/361 X |
| 3,391,611 | 7/1968 | Jenney | 91/459 |
| 4,054,154 | 10/1977 | Mason | 91/459 |
| 4,138,088 | 2/1979 | Cyrot | 137/625.64 |
| 4,143,583 | 3/1979 | Bauer | 91/509 |

Primary Examiner—Edward J. McCarthy
Attorney, Agent, or Firm—Joseph B. Balazs

[57] ABSTRACT

An electrical system for circumventing failed servo valves or interconnecting wiring in an aircraft actuator control system having tandem-connected, redundant, electro-hydraulic servo valves. Triacs, in the simplest embodiment of the invention, are in bridge connection with the operating coils of the servo valves, and are utilized to sense the failed condition and to substitute a shunt impedance element at the open circuit in order to maintain the integrity of the remainder of the system. Alternate embodiments of the invention disclose in conjunction with the triacs, sensitive relays to achieve latched-circuit characteristics and optical isolation devices to further reliability of the system by isolating portions of the circuit from the power supply.

18 Claims, 4 Drawing Figures

REDUNDANT SERVO WITH FAIL-SAFE ELECTRIC SYSTEM

BACKGROUND OF THE INVENTION

This invention relates to electric fail-safe systems and more particularly to a system for safeguarding against fluid amplifier and wiring failures in an aircraft servo control system.

It has become common particularly in the aircraft fly-by-wire systems to employ redundant devices for safequarding against failure of any one component of the system, and it is known for example to employ multiple valving arrangements to achieve such redundancy.

Thus, for example in U.S. Pat. No. 4,138,088 entitled Device for Controlling Hydraulic Motors, there is disclosed a control system for an aircraft actuator which utilizes four fluid amplifiers or electro-hydraulic servo valves acting in pairs and with the pairs of valves acting in tandem to cause movement of a valve spool, which in turn through associated valving structure causes a desired movement of an output device, typically a hydraulic actuator connected by suitable linkage to a control surface of the aircraft. The fluid amplifiers in such arrangement are controlled in separate channels of command information and any one of the fluid amplifiers is capable of effecting the desired output for the actuator element. This is accomplished by amplifiers acting in concert upon a common valve spool in a mechanical summing arrangement. In such arrangement two pairs of fluid amplifiers are mechanically interconnected at one end of the spool for the common actuation of the valve spool with loss of any one fluid amplifier being detected through angled movement of a pivoted connecting member. Such type of failure is monitored to create an electrical signal which is then utilized to energize a solenoid valve to hydraulically disengage the faulty fluid amplifier pair from the control system allowing the remaining pair of fluid amplifiers at the other end of the valve spool to provide the control function in an unhindered manner.

Fluid amplifier pairs are employed in such control system not only for mechanical redundancy but also so that duplicate channels of electrical fly-by-wire information may be delivered to the system from a remote command location. In such system failure of any one pair of amplifiers due to electrical fault is also accommodated by continued operation of the second redundant pair in a manner previously described. In still further variations of such systems and in order to further increase reliability of the electrical portion of the control, as this is usually considered more susceptible to failure than that of the mechanical elements, arrangements have been devised wherein four channels of command input information in redundant format are applied to all of the fluid amplifiers in a servo control system of the type described previously. In such system, each one of the fluid amplifiers includes four separate coil windings therein adapted for energization by the four input channels of information. Each of the channel coils of the fluid amplifiers is connected to the respective channel coil of other fluid amplifiers in a series circuit confiquration to provide a common signal to all of the fluid amplifiers, sufficient to actuate same. Thus with four channels of input command information applied to all of the fluid amplifiers, reliability of the system is increased considerably in that separate routings of the signals may be made through the structure of the aircraft to accommodate damage to any one portion thereof while still maintaining full fluid control dynamic capability at the fluid actuator.

In achieving this increased reliability however, the system has become particularly susceptible to the type of failure in which all of the coils in any one particular fluid amplifier might become faulted through a common incident, creating an open circuit condition in all of the four channels of information, obviating the advantage of having the redundant channels. While an open circuit condition in any one channel or up to three of the channels may be accommodated by the redundancy of the remaining channels, the particular fault condition described which is common to all of the channels has not found a solution in the prior art.

SUMMARY OF THE INVENTION

It is an object of the present invention to provide a new and improved electric control system for series connected circuits and more particularly for redundant control systems for aircraft having two or more electro-hydraulic servo valve amplifiers energized by common signals in a redundant circuit arrangement. It is a particular object of this invention to provide a fail-safe system for the energization of plural fluid amplifiers acting in a paired tandem arrangement in which four channels of command input information are applied commonly to all of the fluid amplifiers.

The primary type of fault to be protected by the apparatus of this invention is the open circuit type of fault which is occasioned by the close physical spacing of the separate channel coils in each fluid amplifier, which design configuration necessarily increases susceptibility to common failure. Upon such open circuit condition occurring, energization to all of the remaining fluid amplifiers is interrupted producing complete loss of electric control of the hydraulic actuator. To avoid such condition it is necessary to bypass the faulted fluid amplifier or the associated interconnecting wiring, the latter also being susceptible to the same type of failure because of the multiplicity and proximity of connections, with an alternate circuit which will deliver the desired command signal to the remaining fluid amplifiers in substantially the same state as prior to the failure.

The apparatus employed to achieve this condition is essentially only a bypass circuit which will route the channel command signals around the faulted portion of the circuit and direct them to the remaining operative portions. In doing so the bypass circuit must be sufficiently sensitive to operate with the relatively low level signals employed in servo control systems and must be capable of handling the typical bidirectional signals encountered. Further it should have a good degree of immunity to transient or spurious signals and operate consistently and reliably. Still further, and because of the necessity for duplication in a system where on the order of sixteen channel coils are to be protected, the apparatus preferably requires only a minimum number of additional components and associated interconnecting wiring over the basic servo system, and it is advantageous that these components produce little or no effect upon the basic system, when in their idle condition.

The means for achieving this end is most conveniently accommodated in a bridge circuit arrangement in which detection of the fault condition can be readily made. The bridge circuit is particularly suited for this purpose inasmuch as it is sensitive to both positive and negative input signals which are typical of servo system error input information, the circuit being capable of tracking same and producing a resultant null condition or balanced signal output.

Triacs are used in all embodiments of the invention, providing a bidirectional switching device which is capable of detecting an open-circuit condition by way of unbalance of the bridge circuit and connecting an impedance in shunt therewith to re-establish the circuit. More complex embodiments of the invention introduce relays or other switching devices to lock in the bypass circuit elements to avoid erratic operation, while power supply or circuit isolation can be provided by the use of optoisolator devices and the like as a measure to avoid common faults.

DETAILED DESCRIPTION OF THE INVENTION

Figure 1:
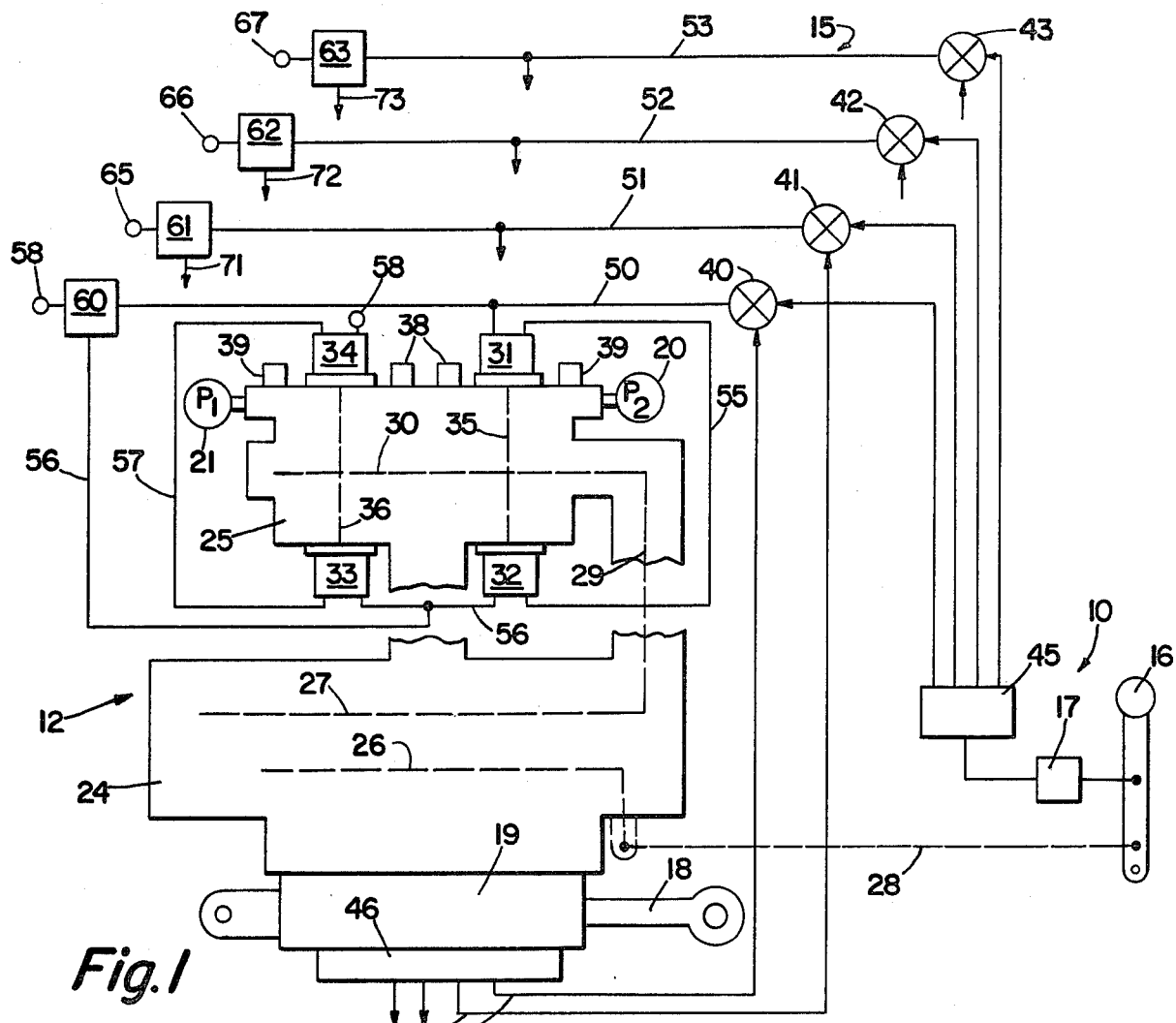
FIG. 1 is an exterior view of a servo system actuator for aircraft employing four servo fluid amplifiers shown in relation to a schematic circuit diagram of the fail safe system of the instant invention.

Referring now to FIG. 1 there is shown in exterior view and in schematic form a control system for an actuated mechanism of an aircraft, comprising a remote command station 10, an actuator system 12 and interconnecting circuitry and wiring 15 which comprise the elements of a fly-by-wire form of servo control system. In the system described, the pilot input is applied at a control lever 16, converted by means of sensor device 17 to provide at its output an electrical signal indicative of a desired position of a remote portion or element of the aircraft, typically a controllable air foil surface of same. The input command applied at control lever 16 is converted into movement of an output actuator rod 18 forming a part of the piston and cylinder hydraulic actuator unit 19, the output rod 18 in turn being adapted for connection to a portion of the aircraft by means of suitable linkage. Hydraulic fluid under pressure is supplied by dual fluid pressure sources 20, 21 for effecting movement of the actuator rod 18 by means of a master valve 24 and command valve 25, the housings for such units being joined for fluid transfer and mechanical interconnection therebetween but shown broken away in FIG. 1 to accommodate showing of electrical circuitry. Master valve 24 comprises a mechanical spool valve portion indicated by the dashed line 26 and an electrical spool valve portion indicated by the dashed line 27 for controlling the flow of fluid from the sources 20, 21 to the hydraulic actuator 19 for positioning of the output rod 18. The mechanical spool 26 is an override device in the event of electrical system failure for providing direct pilot control of the actuator 19 by means of a mechanical linkage between the mechanical spool 26 and the control lever 16 as indicated by the dashed line 28. The electrical spool valve 27 is normally the primary controller and is also mechanically positioned for control of the output actuator 19, this positioning however, being effected by means of mechanical linkage indicated by dashed line 29, reflecting the positioning of a command valve spool 30. Command valve spool 30 in turn is positioned under the direction of a group of four electrohydraulic servo valves or fluid amplifiers 31–34 which are connected by way of the circuitry and wiring 15 to the remote command station 10 in a fly-by-wire servo actuator system well understood in the art. For a detailed understanding of such fly-by-wire system, reference is made to previously mentioned U.S. Pat. No. 4,138,088, entitled Device for Controlling Hydraulic Motors.

For purposes of understanding this invention however only a brief description of operation of such type of system is provided herewith. Essentially in such system fluid amplifiers 31–34 are independently energized and operate in pairs to control the positioning of the command valve spool 30. Thus, fluid amplifiers 31 and 32 are mechanically interconnected to the command spool 30 as indicated by the dashed line 35 while fluid amplifiers 33 and 34 are similarly interconnected as indicated by dashed line 36. The command valve spool 30 provides a mechanical interconnection and summation of all of the fluid amplifier outputs, thereby effecting a redundant control of such valve spool. In the event of failure of any one fluid amplifier 31–34, the associated interconnecting mechanism 35 or 36 will exhibit angular movement about a pivot rather than a normal linear movement, which angular movement will be recognized by an associated detector unit 38, such as a linear variable differential transformer to provide a signal to an associated solenoid valve 39 which is connected in the fluid supply line from the fluid source 20. Thus, for example, in the event of failure of fluid amplifier 31, continued control of spool 30 by its paired amplifier 32 will cause angular movement by mechanism 35, in turn monitored by one of the associated detectors 38 to energize its one of the associated solenoids 39, thereby shutting off connection from the fluid power source 20. Such disconnection disables both of the paired fluid amplifiers 31, 32 but allows substantially unhindered continued control by the remaining pair of fluid amplifiers 33, 34 from their associated fluid power source 21.

The fluid amplifiers 31–34 are servo devices which receive error signals from servo amplifiers 40–43, these in turn operating upon command signals at one input and feedback signals at the other, the latter being derived from the hydraulic actuator unit 19. Four channels of command information are provided to the servo amplifiers 40–43, these being identical signals derived from the sensor device 17 monitoring movement of the control lever 16, merely being converted into four identical signals by means of a suitable electrical converter 45. The four channel signals thus may be routed through different portions of the aircraft between the remote command station 10 and the actuator device 12 to provide redundancy in the event of failure of any one portion of the system. Feedback signals representative of the position of the output actuator rod 18 are derived from feedback device 46 which may also comprise a linear variable differential transformer monitoring position of the actuator rod 18 and suitably energized from a power source. Four channels of identical feedback information are provided on lines 47, only two of which are indicated in full in FIG. 1 for purposes of clarity. The feedback lines 47 are routed, again by different paths as a safeguard, to individual ones of the servo amplifiers 40-43 in a manner well understood in this art.

The error signals on lines 50-53, being respectively the outputs of servo amplifiers 40-43, are applied in four separate channels of information to each of the fluid amplifiers 31-34 to provide a four-way redundant system, so that complete dynamic control can be maintained in spite of the failure of any one of the channels of information. Again, for purposes of clarity only one of the channels of information is shown in complete connection in FIG. 1, this being the output of servo amplifier 40 occurring on line 50 which is applied to a first channel coil in servo amplifier 31, which in turn is connected in series by line 55 to a first channel coil in fluid amplifier 32, in turn connected in series to similar first channel coils in fluid amplifiers 33 and 34 by means of wiring 56, 57, culminating in a power supply bus at terminal 58.

The remaining channels of information on lines 51-53 are similarly applied in individual channel series connections to the fluid amplifiers 31-34 in a similar manner. Such arrangement provides four isolated channels of control information which are applied in common to all of the fluid amplifiers 31-34, a summation of such signals occurring in the command valve spool 30 by means of the mechanical interconnection therein, as previously described.

Figure 3:
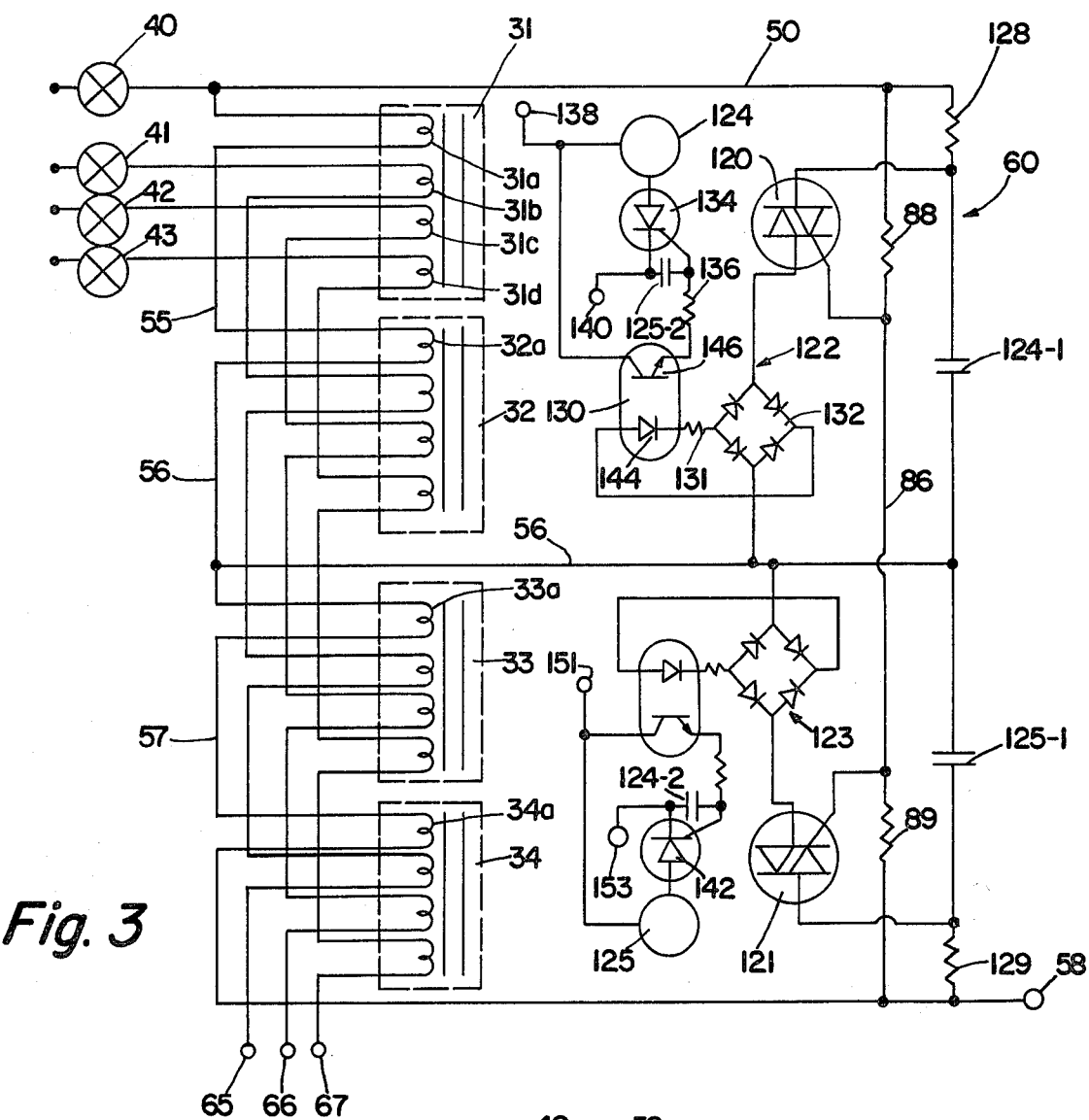
FIG. 3 is a schematic circuit diagram of another embodiment of the invention showing the interconnecting wiring for the four servo fluid amplifiers and one channel of the electric system.

The electrical circuitry of the fluid amplifiers 31-34 will become more apparent with reference to the showing of an alternate embodiment of the invention in FIG. 3, which however employs an identical interconnection for the fluid amplifiers 31-34. With reference to FIG. 3 in which like reference numerals are used for corresponding components identified in FIG. 1, there is shown in schematic form the four fluid amplifiers 31-34 each having four isolated electrical coil windings therein, respectively identified by the reference letters a-d appended to the reference numeral for each valve. Thus, for the one channel in which the full electrical circuit diagram is shown the electrical interconnection is made from the output of servo amplifier 40 on line 50 to one side of coil 31a, the other side of the coil being connected by wire 55 to one side of the coil 32a, that coil being connected by wire 56 to coil 33a and in turn to coil 34a by wire 57, culminating in an output connection at terminal 58. This provides a series connection of the coils with coil pairs 31a, 32a and 33a, 34a having the common center connection on line 56.

A similar series connection of the isolated coils in each fluid amplifier is made for each of the channels occurring at the outputs of the servo amplifiers 41-43, the wiring of each channel culminating respectively at the power supply terminals 65, 66, 67. Again in FIG. 3 only one channel of information is depicted in full in the circuit diagram for purposes of clarity. It will be apparent, however, that each fluid amplifier 31-34 comprises four isolated coil windings therein, energized by the four channels of command input information and that if a common failure should occur at one of the fluid amplifiers affecting all four of the windings therein and creating an open circuit condition, loss of signal would occur also at the remainder of the fluid amplifiers due to the series circuit interconnection arrangement. This system is similarly sensitive to deficiencies in the interconnecting wiring between the fluid amplifiers such as for example in the interconnections 55-57 which for all of the channels may be closely spaced or in failure in any one part of the series circuit which would cause loss of signal to all of the remainder of the circuit, even if the latter were otherwise still fully capable of functioning.

In order to accommodate such situations and to allow continued operation of the remainder of any one channel of control or all of the remaining operative channels of control, fail safe circuit devices 60-63 are provided in connection with the fluid amplifiers 31-34. As seen in FIGS. 1 and 3, the fail safe circuit devices 60-63 are in connection respectively with servo amplifiers 40-43 by means of leads 50-53 at first terminals, having second terminals connected respectively to power supply terminals 58, 65, 66, 67. The third terminals 71-73 of the fail-safe circuits 61-63 are connected to a respective common junction between the pairs of fluid amplifiers for each channel of information, similar to the common junction line 56 for the first channel of command information which is fully depicted in FIG. 1 and FIG. 3 as the third terminal of fail-safe circuit 60.

Referring now more particularly to the preferred embodiment of the invention depicted in FIG. 2, there is shown again the connection for only one channel of information, comprising the series connection of coils 31a-34a of respective fluid amplifiers 31-34, receiving an input at one end from line 50 comprising the output of servo amplifier 40 and connected at the other end to terminal 58, using the same reference numerals for the same elements in correspondence with the showings of FIGS. 1 and 3. Coils 31a, 32a serve as a pair in the circuit corresponding to the paired fluid amplifiers 31, 32 while the coils 33a, 34a serve as a second pair of coils corresponding respectively to the fluid amplifiers 33, 34. A common connection 56 occurs at the junction of coils 32a, 33a.

Terminals 50, 56, 58 in turn serve as connections for the fail-safe circuit 60 for this channel of information. In shunt connection with each of the pairs of coils 31a, 32a and 33a, 34a is the combination of a series connected switching element 75 and impedance element 76 which perform the functions of sensing the open-circuit condition of the portion of the circuit to which they are connected and for switching the impedance element 76 into connection with the remainder of the circuitry so as to maintain energization of the latter.

Figure 2:
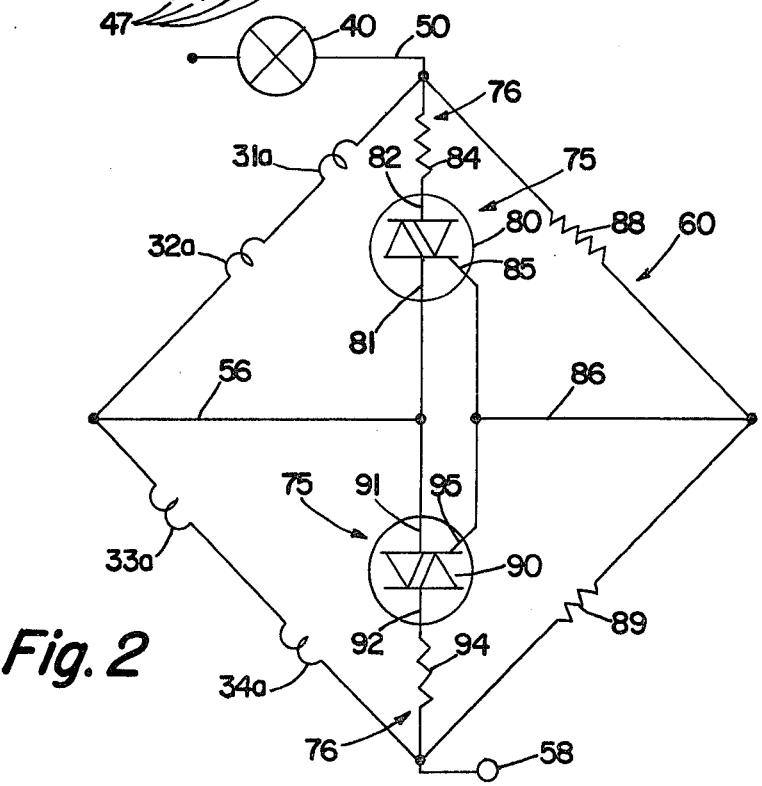
FIG. 2 is a schematic circuit diagram in more detail of the preferred embodiment of fail-safe system of the invention showing only one channel of information for purposes of clarity.

In this embodiment of the invention the fail-safe circuitry 60 in connection with the first channel series connected coils 31a-34a comprises together with the coils a bridge circuit arrangement which is utilized to detect an open circuit condition in any one of the coils 31a-34a. In this circuit the switching element 75 for each half of the circuit comprises a triac having a first main terminal 81 connected to the common junction 56 between series connected coils 32a, 33a and a second main terminal 82 connected to one end of resistor 84, the latter comprising the impedance element 76. The other end of resistor 84 is connected to lead 50 in common with one end of first channel coil 31a. Gate electrode 85 of the triac 80 is connected by line 86 to the junction of a pair of resistor elements 88, 89, forming a voltage divider between the terminals 50, 58. A duplicate circuit comprising triac 90 having a first main terminal 91, a second main terminal 92 and gate terminal 95 is connected in series with resistor 94, the combination of such switching element and impedance element being connected in shunt with the remaining first channel fluid amplifier coils 33a, 34a as depicted in FIG. 2. Gate electrode 95 is connected in common with gate electrode 85 of triac 80 to the junction 86 of the voltage divider 88, 89.

Thus, in operation with coils 31a, 32a forming one leg of a bridge circuit and with coils 33a and 34a forming a second leg thereof, all in series connection between lead 50 and terminal 58 and presuming substantially equal impedances in each of the coil windings 31a–34a, the voltage occurring at common lead 56 will follow proportionately that voltage occurring between lead 50 and terminal 58. Similarly with resistors 88 and 89 forming the third and fourth legs of the bridge circuit, junction 86 forming the null terminal of the bridge circuit, will follow proportionately the voltage occurring between lead 50 and terminal 58 and under normal conditions will be substantially equal to the voltage occurring at line 56. Since lines 56 and 86 are connected respectively to the first main terminals 81, 91 and to the gate terminals 85, 95 of the triacs 80, 90, substantially no difference in voltage will occur between the terminals, maintaining the triacs 80, 90 in a non-conducting or substantially open-circuit state.

In the event of failure, however, of any one or more of the fluid amplifier coils 31a–34a, unbalance of the bridge will occur creating a voltage differential between lines 56, 86 thereby developing gating current for that one of the triacs, 80, 90 which will be energized for conduction, thereby causing conduction of same.

Thus, for example, if amplifier coil 31a should fail creating an open circuit condition, the voltage at line 56 would change to approximate that at the terminal 58 due to the lack of current flow through the series circuit consisting of the coils 31a–34a and a voltage difference would occur between lines 50, 56 across the combination of the series connected triac 80 and resistor 84, while the potential at lead 86 would remain substantially unchanged. These changed conditions would create a voltage differential between the common 56 and null 86 terminals of the bridge circuit and thus between the gate 85 and main terminal 81 of the triac 80, creating gating current at the triac 80. Since the triac 80 now also has a potential difference at its main terminals 81, 82, it is switched into conduction permitting current flow through it and the series connected resistor 84. As is well understood in the art, such conduction or switching on of the triac 80 produces a very low impedance connection therethrough so that the resistor 84 is in effect switched into connection with leads 50, 56. The impedance of resistor 84 is selected to be substantially equal to the sum of the d.c. resistances of amplifier coils 31a and 32a such that when the resistor 84 is so connected in shunt, it will be substituted for the impedances of the coils 31a, 32a, to maintain the potential at the terminal 56 substantially the same as prior to the failure, and more importantly to maintain substantially the same current flow through the remainder of the series connected circuit comprising amplifier coils 33a, 34a.

It will be understood that an identical situation occurs in the event of failure of coil 32a rather than 31a and that a similar situation obtains in the event of failure of one of the coils 33a, 34a, in which latter case conduction will be continued through triac 90 rather than through triac 80, in a manner previously described. It should be noted that the bridge form of circuit is particularly suited for the fail-safe circuits 60–63 inasmuch as the error output of servo amplifiers 40–43 is typically of both positive or negative voltages. Such polarity is ignored by the differential voltage development at leads 56, 86 while the traic 80 is a unique device particularly suited for conduction of current in either forward or reverse directions. It should also be understood that similar circuits to that depicted in FIG. 2 for the fail-safe circuit 60 may be applied as the fail-safe circuits 61–63 for similar safeguard of the other three channels of command information applied by way of the servo amplifiers 41–43. It will also be apparent that a simplified circuit is particularly suited for this application in that with redundant channels of control each element must be duplicated a number of times to effect complete control of the system.

In a typical embodiment of invention the fluid amplifier coils 31a–34a could each constitute an impedance value of approximately 60 ohms, in which instance each of the resistors 84, 94 would be selected to have an impedance of 120 ohms, this being a value equal to that portion of the series connected circuit in which each is to be shunted. Triacs could constitute Motorola types MAC 92A–4, these being relatively sensitive gate devices which will tend to limit the current drain of the entire fail-safe system. In such embodiment resistors 88, 89 could each be on the order of 1,000 ohms to provide a sufficient gate current to the traics 80, 90 upon bridge unbalance and yet not unduly load the output of the servo amplifiers 40–43 under all conditions. The servo amplifiers 40–43 are devices well known in the art and typically will constitute some form of operational amplifier which may provide any desired voltage or current gain or conversion therebetween and typically may provide an output on lines 50–53 on the order of positive or negative 10 volts.

Figure 4:
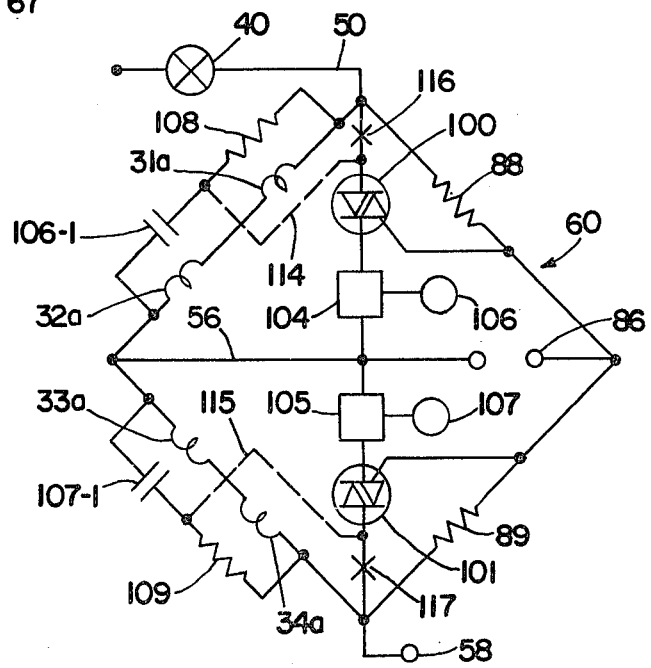
FIG. 4 is a schematic circuit diagram of one channel of yet another embodiment of the invention.

Referring now to FIG. 4 there is shown yet another embodiment of the invention, again being depicted in single channel format using the same reference numerals as used in FIGS. 1–3 for comparable components wherever possible. Thus, a fail-safe circuit 60 is shown again in only a first channel circuit connection with coils 31a, 32a forming one leg of the electrical bridge and coils 33a, 34a forming a second leg having common terminal 56 and being energized from the output of the servo amplifier 40 between line 50 and terminal 58. Substantially identical triacs 100, 101 are employed, receiving gate electrode energization from the null junction 86 of a pair of series connected resistors 88, 89 forming a voltage divider network similar to that set forth in FIG. 2. In this embodiment of this invention, however, the triacs 100, 101 are connected in series respectively with latching circuits 104, 105, each such series combination being connected in shunt connection with the appropriate leg of the bridge circuit bearing the amplifier coils to be safeguarded. The latching circuits 104, 105 are circuits which can take any type of configuration well known in the art to provide the functions of turning on and maintaining the circuit in the latched condition upon receipt of current flow thereto, thereby to provide continuous energization of associated relay coils 106, 107. This type of circuit may conveniently be formed utilizing normally open and normally closed contacts of the relay. As shown in FIG. 4 associated contacts 106-1, 107-1 of the relay coils 106, 107 are closed upon the energization of the latter to connect impedance devices 108, 109 respectively in parallel or shunt connection with the first and second mentioned legs of the bridge circuit containing the pairs of the fluid amplifier coils 31a–34a.

Thus, it may be seen that upon failure for example of fluid amplifier coil 31a creating an open circuit condition, unbalance of the bridge circuit will occur and triac 100 will be biased into conductivity thereby energizing latching circuit 104 and its associated relay coil 106, causing closing of contact 106-1 and creating an alternate current path through impedance element 108 to maintain the remainder of the circuit comprising amplifier coils 33a, 34a in an energized condition. Latching circuit 104 is capable of responding to bi-directional current flow in a manner similar to that of triac 100 thereby accommodating both positive and negative voltage signals between the line 50 and terminal 58 and because of its latching characteristic once energized locks in and maintains the energization of the relay coil 106. This action is particularly advantageous in avoiding the transient conditions which might occur upon intermittent faults of the amplifier coil 31a or associated wiring between any of the coils which could cause rapid fluctuations of voltage and current conditions of the circuit. While the triacs 100, 101 of this embodiment of this invention or even those triacs 80, 90 of the FIG. 2 embodiment are capable of accommodating most transient conditions, such accommodation is dependent upon the characteristics of the particular triacs selected and none are likely capable of responding to all transient circuit conditions. While the circuit in FIG. 2 is preferred because of its simplicity in number of components resulting in associated reliability, the FIG. 4 embodiment of the invention, while introducing a substantial number of additional components, also is capable of a higher degree of capability of circuit operation which must be considered in the trade off with circuit reliability.

A modification that could be made in the FIG. 4 embodiment of the invention would be to make the connections as shown by the dashed lines 114, 115, while opening the circuit at the points indicated by the x's 116, 117. This would make the circuit arrangement similar to that of the FIG. 2 embodiment of the invention. This would provide the advantages of circuit balance and in the event of failure of the relays 106, 107 or their latching circuits 104, 105, would substitute the triacs 100, 101 for their respective mechanical contacts, thus providing even further protection against failure for the system.

Yet another embodiment of this invention is depicted in FIG. 3 which has been partially described previously and in which like reference numerals are utilized for like components in the other described embodiments of the invention. Again, a fail-safe circuit 60 is indicated for only one channel of command information, receiving energization on line 50 as the output of servo amplifier 40 with respect to the terminal 58, and having a first bridge leg comprising amplifier coils 31a, 32a and a second bridge leg comprising amplifier coils 33a, 34a with common connection 56 therebetween. The fail-safe circuit 60 again comprises a dual circuit for protecting against failure of the first or second legs of the bridge circuit and only one portion of the fail-safe circuit 60 will be described in detail, it being apparent that similar components are used and a similar operation obtains in the remainder of the circuit.

Third and fourth legs of the bridge are provided again by series connected resistors 88, 89 having the null junction 86 therebetween, which in turn is connected to the gate electrodes of triacs 120, 121. Latching circuits 122, 123 are connected in series with the triacs 120, 121 respectively to provide a similar mode of operation as that described with respect to the latching circuits 104, 105 of the FIG. 4 embodiment of the invention. The latching circuits 122, 123 comprise respective relay coils 124, 125 in turn having respective contacts 124-1, 125-1 adapted when closed, for shunting impedances 128, 129 with the respective first or second legs of the bridge circuit containing the amplifier coils 31a-34a.

Latching circuit 122 includes an opto-isolator device 130 receiving energization by way of current-limiting resistor 131 from the bridge circuit 132 and providing an output for energization of an SCR 134 by means of series connected resistor 136. SCR 134 is connected in series with relay coil 124 between the positive terminal 138 and the negative terminal 140 of a DC power source. Relay contacts 124-2 of the relay coil 125 in the other half of the fail-safe circuit 60 are connected between the gate and cathode electrodes of the SCR 134 to prevent energization of the latter in the event that the other portion of the fail-safe circuit has been energized. This is an interlocking device to prevent energization of both halves of the fail-safe circuit at the same time, which would introduce unnecessary drain upon the power supplies energizing each of the circuits. Similar contacts 124-2 of relay coil 124 are included at the gate electrode of the SCR 142 in the other portion of the fail-safe circuit.

As is well known in the art, an opto-isolator 130 may comprise the combination of a light emitting diode 144 and a light sensitive transistor 146 in a common package sealed from extraneous influence. A suitable device for such opto-isolator 130 or optical coupler is the 4N33 type component produced by several manufacturers.

In operation, upon recognition of an unbalance of the main bridge circuit by the fail-safe circuit 60, resulting in conduction of triac 120, energization will be applied to bridge rectifier 132, which is provided to accommodate either polarity of signal and in turn apply energization to light emitting diode 144 in the opto-isolator 130. Emission of light will be recognized in transistor 146 to produce sufficient current at the gate electrode of SCR 134 to cause conduction thereof and current flow through the relay coil 124. Energization of the relay coil 124 will cause closure of associated contacts 124-1, thereby connecting impedance element 128 in circuit to complete the path between lead 50 and the second portion of the bridge circuit comprising amplifier coils 33a, 34a, thereby maintaining energization of the latter. Once energized, SCR 134 will maintain its energization until purposely de-energized and reset by removing power from positive terminal 138 or by any other suitable commutation means but such resetting will normally not be needed until the failed circuit condition is remedied.

By this circuit arrangement a further measure of reliability is provided in that isolation is effected between various portions of the fail-safe circuit 60, particularly in regard to the power supplies. This helps to avoid the problem of a failed component causing an excessive load upon a common power supply, which in the event of failure could create a catastrophic failure of the complete system. In FIG. 3 the power supply producing power at the terminals 138, 140, by virtue of this circuit could be separate from that supplying the paired half of fail-safe circuit 60, having power supply terminals 151, 153 and could as well be isolated from that power source supplying the servo amplifiers 40-43, feedback component 46 and associated components in the system.

In all of the embodiments of the invention shown, two coils such as 31a, 32a, are shown in the first and second legs of the bridge circuits, however it will be apparent that fewer or lesser coils could comprise each leg of the bridge or that different types of components could be accommodated by the fail-safe type of circuit arrangement of the instant invention. Further as is well known in bridge circuit arrangements, such bridge legs need not be of equal impedance value so long as a bridge balance is obtained by appropriate selection of the impedance values of the remaining bridge legs.

I claim:

1. In an electrical circuit having plural components in series connection therein for energization from a single power source, means for establishing an electrical path about failures in the circuit to maintain energization of the remaining components, comprising
   a triac in shunt connection with a portion of said series circuit, and
   means for gating said triac into conduction upon open-circuit failure of said portion of said series circuit, thereby to establish an electrical path to said remaining components.

2. The electrical circuit as set forth in claim 1 wherein said gating means comprises a voltage divider proportional to have a voltage tap thereon approximately the voltage level at said components to which said triac is connected, said voltage tap being connected to the gate electrode of said triac, thereby to maintain said triac non-conductive until, due to open circuit failure, a sufficient voltage difference occurs to cause energization of said triac.

3. The electrical circuit as set forth in claim 2 wherein said plural components and said voltage divider comprise a bridge circuit, one main terminal and said gate electrode of said triac being connected at the balance terminals of said bridge circuit.

4. The electrical circuit as set forth in claim 3, further including an impedance element in said electrical path in series with said triac, said element having impedance to match the impedance of said components in shunt connection with said triac, such that when said triac is gated on, voltage drop across said impedance element will approximate that which occurred across said elements.

5. The electrical circuit as set forth in claim 4 further including a second triac in shunt connection with said remaining elements of said circuit, the gate electrode of said second triac being connected in common with said gate electrode of said first triac.

6. The electrical circuit as set forth in claim 5 further including a second impedance element in series connection with said second triac, whereby open circuit failure of either portion of said circuit will result in energization of said triac in shunt connection therewith to establish an electrical path through the associated impedance element to maintain the remainder of the circuit in a substantially unaltered, energized condition.

7. The electrical circuit as set forth in claim 3 further including a relay circuit in said electrical path in series connection with said triac, said relay having contacts that when closed, connect an impedance element in shunt with said circuit components.

8. The electrical circuit as set forth in claim 7 wherein said relay circuit further includes contacts that when closed, maintain energization of said relay, thereby to lock said relay in the energized condition.

9. The electrical circuit as set forth in claim 3 further including an optical isolator in said electrical path in series connection with said triac, the output of said isolator being connected to energize a relay circuit, said relay having contacts that when closed, connect an impedance element in shunt with said circuit components.

10. The electrical circuit as set forth in claim 9 further including an SCR in circuit with said relay circuit for maintaining energization of the latter, once energized.

11. A fluid powered servo control system responsive to a plurality of redundant, command input signals, comprising
    a source of fluid under pressure,
    a hydraulic actuator,
    valve means interconnecting said actuator and said source of fluid pressure for control of said actuator,
    a plurality of fluid amplifiers interconnected with said source of fluid pressure and said valve means for selectively controlling said valve means in response to said input signals, each said fluid amplifier being connected to receive and being responsive to said command input signals, and
    circuit means in connection with said fluid amplifiers, said circuit means being operative to sense an open circuit condition at any one of said fluid amplifiers and to electrically bypass such inoperative fluid amplifiers to maintain application of said input signals to remaining operative fluid amplifiers.

12. The control system as set forth in claim 11 wherein said fluid amplifiers are in electrical series connection so that each said fluid amplifier receives each said command input signal, said circuit means comprising impedance means matching the electrical impedance of said fluid amplifier and switching means for connecting said impedance means in shunt relation to an inoperative fluid amplifier for maintaining the series connection to operative fluid amplifiers in substantially unaltered condition.

13. The control system as set forth in claim 12 wherein the control system is responsive to positive and negative command input signals and said switching means comprises triacs capable of switching said positive and negative command signals.

14. The control system as set forth in claim 13 wherein said system comprises four fluid amplifiers for controlling said valve means, said fluid amplifiers being mechanically connected in pairs and said pairs being mechanically connected in tandem, means for sensing inoperativeness of one of said pairs of fluid amplifiers and for disabling the other of said same pair, each said fluid amplifier comprising four channels of isolated coils responsive to four redundant channels of command input signals, said coils in each channel being connected in series, each said triac being in connection with said coils of a pair of said fluid amplifiers and being operative to bypass the channel command signal to the other pair of said fluid amplifiers upon circuit inoperativeness of said first recited pair.

15. A fail-safe electrical system having plural components therein energizable from a power source in dependence upon one another, comprising means connecting pairs of said components in series relation with the power source for energization thereby, the junction of said pair of components providing a common electrical signal indicative of the relative impedances of said components and the level of said power source,
    a pair of impedance elements connected in series relation with the power source, said impedance elements having a predetermined relative impedance to provide a null signal at the junction thereof indicative of the level of said power source and corresponding with said common signal, means for comparing said common and said null signals to determine correspondence therebetween, said comparing means operative to become energized upon lack of correspondence between said common and said null signals, such condition being indicative of failure of one of said components or said connecting means, impedance means adapted for substitution in the system in place of said failed components in order to maintain the integrity of the series circuit connection providing energization from said power source to said components which have not failed, and switching means for connecting said impedance means in circuit, said switching means being operative in response to energization of said comparing means.

16. The system as set forth in claim 15 wherein said plural components comprise fluid amplifiers in a servo control system, said fluid amplifiers having energizing coils interconnected by said connecting means.

17. The system as set forth in claim 16 wherein each said pair of components comprises a further pair of fluid amplifiers, each said fluid amplifier having plural windings interconnected in separate channels of energization, said channels providing redundant, command input signals as separate power sources for each channel.

18. The four channel redundant servo system set forth in claim 17 further including switching, comparing and impedance means for each channel providing a security circuit for each channel, each said security circuit being operative independently of the other of said security circuits to maintain the electrical integrity of non-failed fluid amplifiers in the servo system.

* * * * *

UNITED STATES PATENT AND TRADEMARK OFFICE
CERTIFICATE OF CORRECTION

PATENT NO. : 4,244,277
DATED : January 13, 1981
INVENTOR(S) : William D. Avis

It is certified that error appears in the above—identified patent and that said Letters Patent is hereby corrected as shown below:

Column 11, line 20, "proportional" should read -- proportioned --.

Column 12, line 30, "said" should read -- each --.

Signed and Sealed this

Fourteenth Day of April 1981

[SEAL]

Attest:

RENE D. TEGTMEYER

Attesting Officer   Acting Commissioner of Patents and Trademarks